US010822029B2

(12) United States Patent
Farr et al.

(10) Patent No.: US 10,822,029 B2
(45) Date of Patent: Nov. 3, 2020

(54) PAVING MACHINE WITH SMART STEERING CONTROL

(71) Applicant: GOMACO Corporation, Ida Grove, IA (US)

(72) Inventors: Thomas C. Farr, Ellendale, MN (US); Raymond J. Bumann, III, Ida Grove, IA (US); Chad Schaeding, Ida Grove, IA (US)

(73) Assignee: Gomaco Corporation, Ida Grove, IA (US)

(*) Notice: Subject to any disclaimer, the term of this patent is extended or adjusted under 35 U.S.C. 154(b) by 243 days.

(21) Appl. No.: 15/873,206

(22) Filed: Jan. 17, 2018

(65) Prior Publication Data

US 2018/0208240 A1 Jul. 26, 2018

Related U.S. Application Data

(60) Provisional application No. 62/447,153, filed on Jan. 17, 2017.

(51) Int. Cl.
*B62D 11/00* (2006.01)
*E01C 19/00* (2006.01)
*B62D 55/065* (2006.01)
*B62D 11/20* (2006.01)
*E01C 19/48* (2006.01)

(52) U.S. Cl.
CPC ............ *B62D 11/003* (2013.01); *B62D 11/20* (2013.01); *B62D 55/065* (2013.01); *E01C 19/004* (2013.01); *E01C 19/4893* (2013.01)

(58) Field of Classification Search
CPC ..... B62D 11/003; B62D 11/20; E01C 19/004; E01C 19/4893
USPC .......................................................... 701/41
See application file for complete search history.

(56) References Cited

U.S. PATENT DOCUMENTS

| | | | |
|---|---|---|---|
| 7,938,596 B2* | 5/2011 | Musil | E01C 19/185 404/86 |
| 2002/0185319 A1 | 12/2002 | Smith | |
| 2007/0144796 A1 | 6/2007 | Schaedler et al. | |
| 2007/0152427 A1 | 7/2007 | Olsen | |
| 2008/0253834 A1 | 10/2008 | Colvard | |
| 2008/0253848 A1* | 10/2008 | Alm | B23B 27/1622 407/114 |
| 2016/0137242 A1* | 5/2016 | Dahm | B62D 11/20 180/8.6 |
| 2018/0327022 A1* | 11/2018 | Schaeding | B62D 7/1509 |

* cited by examiner

*Primary Examiner* — Peter D Nolan
*Assistant Examiner* — Luat T Huynh
(74) *Attorney, Agent, or Firm* — Suiter Swantz pc llo

(57) ABSTRACT

A smart steering control system a paving or texturing machine receives path elements corresponding to current and future positions of the machine. By comparing the current and future elements, an expected completion time is derived for exiting the current position and entering the future position; the smart steering control system synchronizes adjustments of the machine's steerable tracks from the current path to the future path. The smart steering control system functions as a virtual tie rod, preventing damage, enhancing the traction control and pulling power of the machine, and preserving the operating life of its components.

17 Claims, 10 Drawing Sheets

PAVING MACHINE WITH SMART STEERING CONTROL

PRIORITY

The present application claims the benefit under 35 U.S.C. § 119(e) of U.S. Provisional App. No. 62/447,153 (filed Jan. 17, 2017), which is incorporated herein by reference.

FIELD OF THE INVENTION

Embodiments of the inventive concepts disclosed herein are directed generally toward a paving and texturing machine configured for programmable control.

BACKGROUND

Some paving and texturing projects may require slipforming and/or texturing around extremely small-radius curved surfaces. Regardless of the precise shape of the curved surfaces, which may include one or more radii, straightline portions, spirals, or freeform curved elements, for a paving machine to successfully slipform or texture a curb (or gutter) according to these curved elements it must be possible to steer the machine around tight or variable curves. For example, the machine may be steered into a curved element in a counterclockwise (or left turn) direction, applying a curb mold or other tool to the curved surface at a desired position. Per the machine layout, while steering counterclockwise a left front track being closer to the radius of the curved element than a rear track such that to enter the curve from a straightline position, the left front track must rotate 70 degrees and the rear track 20 degrees. A steering controller may attempt to turn the largest track angle at full drive, e.g., at 10 degrees/second; in this case, the left front track may take 7 seconds to reach its desired position. If the two tracks are unsynchronized, both tracks would reach the 20-degree turn position in 2 seconds, and the target path element would not be maintained. An alternative solution, prorating track rotation such that the left front rack is at 35 degrees when the rear track is at 10, also fails to maintain the target path element.

It may therefore be desirable to synchronize track rotation with respect to the desired tool position, more effectively minimizing path tracking error—the difference between where the tool needs to be and where it actually is.

SUMMARY

Embodiments of the inventive concepts disclosed herein are directed to a smart steering control system (smart steering controller, SSC) for a paving or texturing machine configured to apply one or more tools along a path corresponding to a curved surface. The SSC may continually receive path elements, either from a manual operator or from an external source (e.g., for remote or autonomous operations), corresponding to current and future positions of the machine. The future position may be directly ahead of the current position or, if the machine is traveling in reverse, behind the current position. By comparing the current and future elements, an expected completion time may be derived for exiting the current position and entering the future position (based, e.g., on a speed of the machine). The SSC may then maintain the desired path element, minimizing path tracking error during the expected completion time by synchronizing the adjustment of the rotational angles of the machine's steerable tracks from a setting corresponding to the current path element to a setting corresponding to the future path element. In this way, the SSC may function as a virtual tie rod whether the machine is under automatic or manual control and regardless of the path surface (straightlines, single and composite radii, spirals, freeform), preventing damage, enhancing the traction control and pulling power of the machine, and preserving the operating life of its components.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
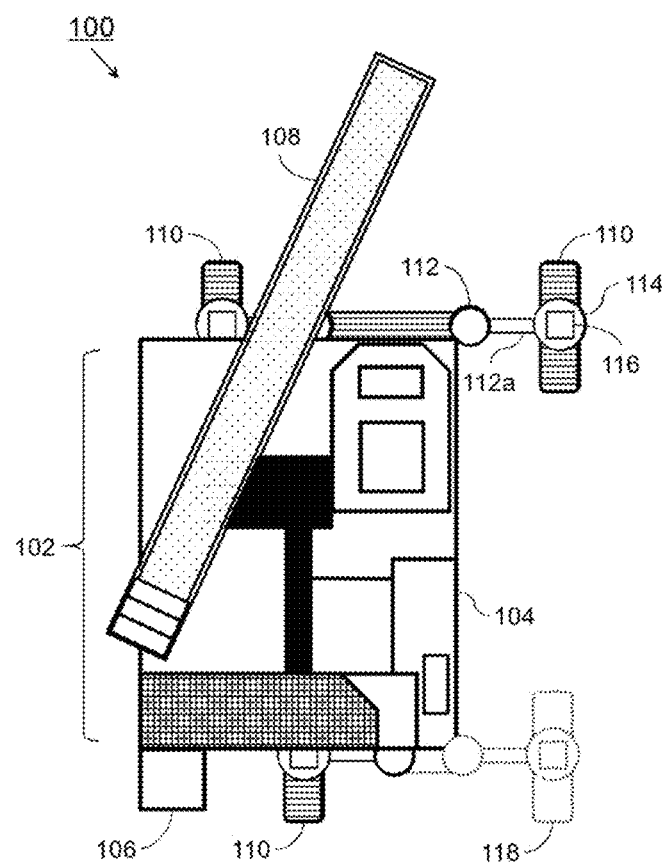
FIG. 1 shows an overhead view of an exemplary embodiment of a paving or texturing machine according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a smart steering control (SSC) system. The SSC in a paving or texturing machine receives path elements corresponding to current and future positions of the machine. By comparing the current and future elements, an expected completion time is derived for exiting the current position and entering the future position; the smart steering control system synchronizes adjustments of the machine's steerable tracks from the current path to the future path. The smart steering control system functions as a virtual tie rod, preventing damage, enhancing the traction control and pulling power of the machine, and preserving the operating life of its components.

Referring to FIG. 1, an exemplary embodiment of a tool carrier 100 (e.g., a paving (or texturing) machine incorporating one or more tools) according to the inventive concepts disclosed herein may include a chassis 102 incorporating an operating platform 104, from which an operator may control the movement of the machine 100 (the tool carrier may be manually or remotely operated, or may operate autonomously). The tool carrier 100 may include one or more tools 106 removably mounted to the machine which may be added to or removed from the machine 100 depending on job requirements. For example, the tool 106 may include, but is not limited to, a curb mold, barrier mold, trimmer, cylinder, conveyor/auger (108), sprayer, trencher, mill or like grinder, planter, grader blade, or combination of one or more of the above.

The tool carrier 100 may be universally propelled and/or steered in any of a variety of modes (e.g., crab steering, front-only or rear-only, coordinated steering, counter-rotate steering, tool steering) via a series of steerable crawlers, or tracks, 110. Each track 110 may be mounted to an actuator 112 for positioning the tracks 110 in a variety of configurations, including an operational configuration shown by FIG. 1 and a transport configuration (not shown) whereby the width of the machine may be minimized for efficient transport via a flatbed truck or like vehicle. Each track 110 may further be mounted to the actuator 112 via a slew drive or similar rotational actuator 114 configured to articulate the track 110 through a full 360 degrees of rotation; in this way, the tool carrier 100 may be steered with optimal precision by adjusting the individual rotational angle of each track. Each track 110 may incorporate a pivot arm 112a articulable by the actuator 112 (e.g., the pivot arm 112a and track 110 may be rotated as one relative to a common z-axis, or the tracks 110 may be mounted to parallelogram-type or telescoping/sliding pivot arms); the pivot arm 112a may further be configured to provide grade control for the chassis 102 by raising or lowering the chassis 102 or a track 110 "up" or "down" (relative to the z-axis) via linear actuators.

Turning the tracks 110 when stopped may cause frame shift. Frame shift causes additional path tracking errors resulting in the tool position being incorrect. By turning the tracks 110 while moving, closed-loop controls continuously correct such errors such that path tracking errors due to frame shift are reduced to negligible, acceptable levels.

The tool carrier 100 may include position sensors 116 for measuring the position of the center of each track 110 as well as the position of the tool 106, and reporting these positions to the SSC. The position sensors 116 may include smart cylinders for telescoping or parallelogram type swing legs/pivot arms or rotation sensors for measuring a rotational angle of the pivot arm 112a or the track 110. The SSC may use feedback from the position sensors 116, along with machine parameters specific to the tool carrier 100 (e.g., pivot arm length, parallelogram geometry, retracted/extended positions of telescoping members) to dynamically calculate track and tool positions for improved steering and/or grade control. The SSC may adjust its calculations based on changes to the machine parameters, e.g., if an ancillary track 118 is added or removed (see FIG. 4A), if a tool 106 is added, changed, or repositioned, or if the pivot arm 112a is rotated to reposition a track 110 (which may alter the weight distribution, center of gravity, and steering characteristics of the tool carrier 100).

Figure 2:
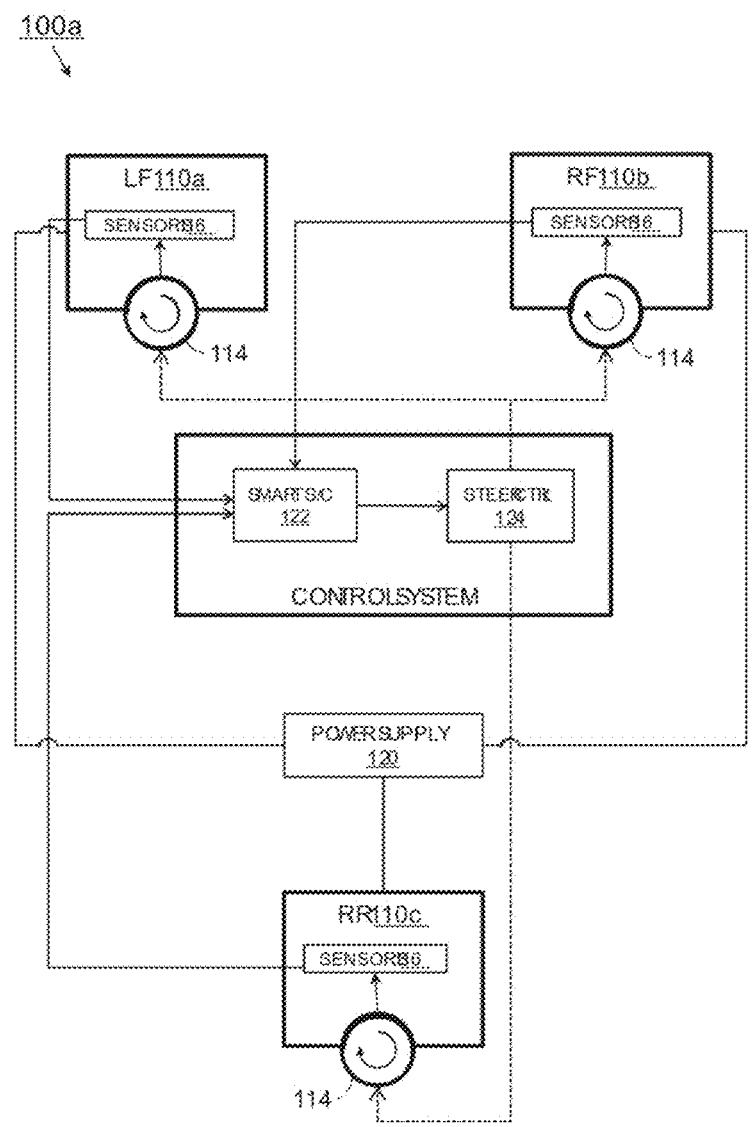
FIG. 2 shows is a diagrammatic illustration of a tool carrier as in FIG. 1.

Referring to FIG. 2, the tool carrier 100a may be implemented and may operate similarly to the tool carrier 100 of FIG. 1, except that the tool carrier 100a may incorporate a left front (LF) track 110a, a right front (RF) track 110b, and a centrally mounted rear (RR) track 110c, each track 110a-c coupled to an onboard power supply 120 for driving the tracks and/or slew drives/rotational actuators 114. Each track 110a-c may incorporate a slew drive or rotational actuator 114 and rotational angle/position sensors 116. The position sensors 116 may report the position of the track 110a-c to the SSC 122, as well as the rotational angle of each individual track 110a-c, for example, relative to a defined reference angle, e.g., a nominal angle (130, FIG. 3) parallel to a straight-line paving direction (128, FIG. 3). The SSC 122 may monitor the position and configuration of the tool carrier 100a relative to a path pre-programmed project plan as well as any resulting path tracking error (e.g., deviation from a stringline or virtual guideline). Based on input from the SSC 122 (as well as, e.g., the current geometry and/or steering parameters of the machine), the steering control system 124 may alter the direction of travel of the tool carrier 100a by rotating one or more of the tracks 110a-c.

Figure 3:
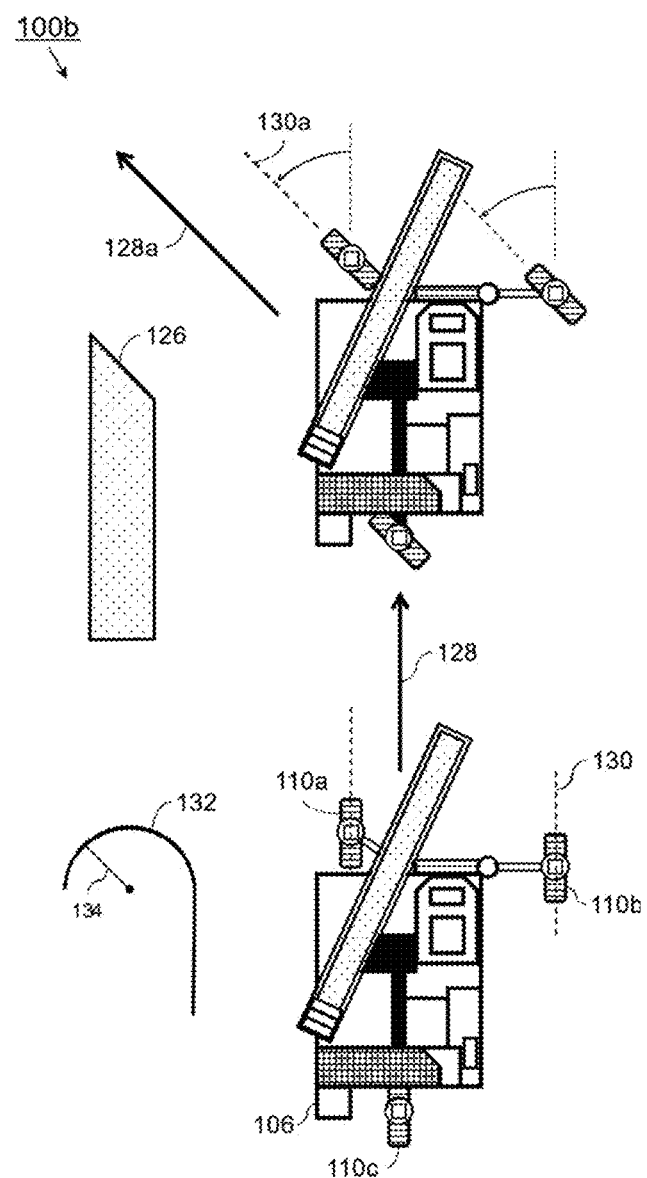
FIG. 3 shows an illustration of the tool carrier of FIG. 1 in operation.

Referring to FIG. 3, the tool carrier 100b may be implemented and may operate similarly to the tool carrier 100a of FIG. 2. For straight-line operations, e.g., paving or trimming a straight curb or gutter 126, the tool carrier 100b may proceed directly forward (e.g., parallel to a paving direction 128) either manually, remotely, or autonomously, each track 110a-c aligned at a nominal angle 130 (e.g., a near-zero angle also parallel to the paving direction 128, allowing for mini- or micro-corrections in steering by a closed-loop steering controller to minimize path tracking error). To continue operations along a different straight paving direction 128a, e.g., at an angle to the initial paving direction 128, the tool carrier 100b may stop at a predetermined point, rotate each track 110a-c in unison to the target angle 130a, and proceed along the new paving direction 128a.

In some embodiments, a transition from a first straight paving direction 128 to a second straight-line paving direction 128a is accomplished via altering a front steering point to rotate the entire tool carrier 100b and maintain a tool's 106 longitudinal edge tangent to the path. In some embodiments, the transition from the first straight paving direction 128 to the second straight-line paving direction 128a is accomplished by altering the orientation of the tracks 110a-c without changing the orientation of the tool carrier 100b. Such orientation may require changing the orientation of the tool 106.

However, certain paving or texturing operations of the tool carrier 100b may incorporate curved surfaces, e.g., curbing a curved surface 132 defined by a short radius 134; for example about 0.61 m (2 feet) or smaller, a composite curved surface defined by more than one radius, or a spiral incorporating constantly varying radii. The tool carrier 100b according to embodiments of the present disclosure may eliminate cross track error more efficiently than conventional approaches by dynamically anticipating and controlling target track angles 130a and track rotation speeds, based on changes in the position of the track 110a-c from path element to path element as well as changes in the tool position and the operator provided tool speed.

In a closed-loop system, an SSC may identify front and rear error components, and multiply such error components by a steering authority to determine a virtual correction. The virtual correction may comprise an angle per millimeter of error. The virtual correction is added to instantaneous target angles to provide effective angles associated with front and rear points of the tool carrier 100b. Given the position of the front and rear points, and their effective angles, a line-line intersection function calculates an intersection, which becomes an effective synchronization point. All track angles and propulsion speeds are then updated using the effective synchronization point to rotate the tracks 110a-c.

Referring generally to FIGS. 4A-4E, the tool carrier 100c may be implemented and may operate similarly to the tool carrier 100b of FIG. 3, except that the SSC (122, FIG. 2) of the tool carrier 100c may define a local coordinate system by which any component or point of the tool carrier 100c may be defined.

Figure 4A:
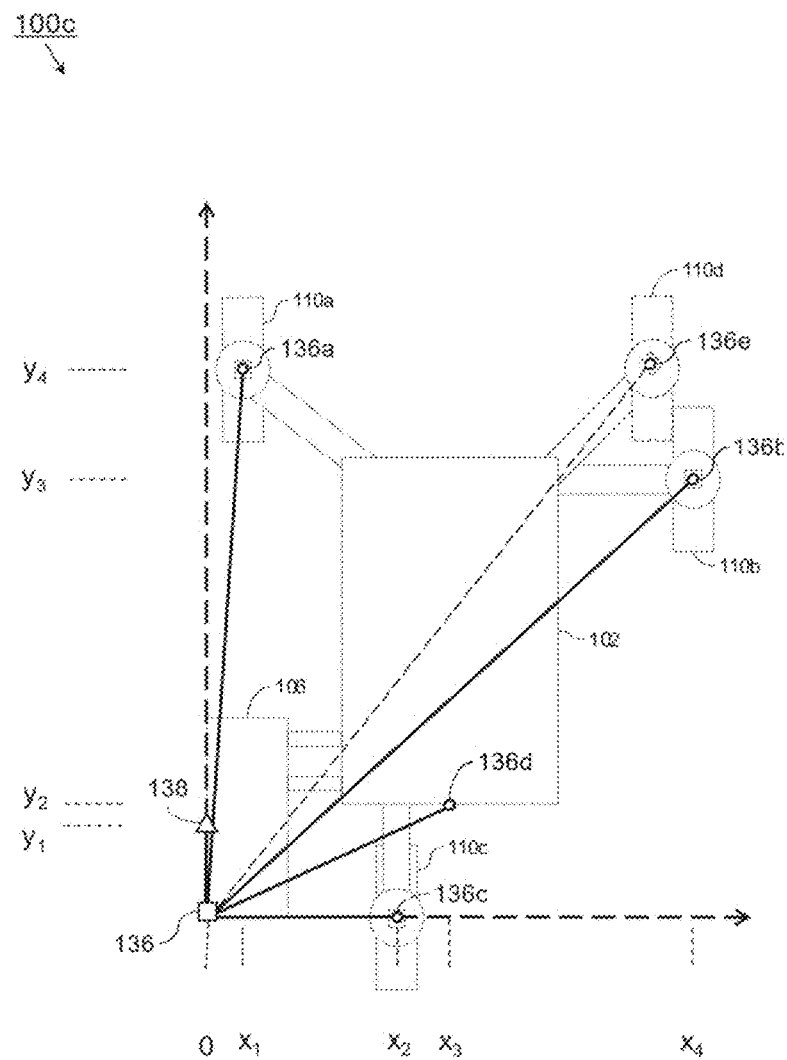
FIG. 4A shows an illustration of a locally referenced coordinate reference frame (CRF) of the tool carrier of FIG. 1.

For example, referring in particular to FIG. 4A, if the tool carrier 100c is to pave a small-radius curved surface (132, FIG. 3) in a counterclockwise or leftward direction, a coordinate system may be defined relative to a tool position 136 or, alternatively, a position of the Rigid Machine Frame (RMF), or chassis 102, corresponding to the rear left corner of the tool 106. Other points of the coordinate system may correspond to coordinate sets [x, y] relative to an origin [0, 0] at the tool position 136. Coordinate sets may include z-axis coordinates (not shown), e.g., if the path incorporates dynamic grade control between three-dimensional current and future path elements or if the relative height of a component is otherwise essential to the path. Assuming the tracks 110a-c remain in fixed positions relative to the tool 106 (and to the tool carrier 100c), the tracks may be defined respectively by coordinate points 136a-c (corresponding to local coordinates $[x_1, y_4]$, $[x_4, y_3]$, and $[x_2, y_0]$ and a midpoint of the chassis 102 defined by coordinate point 136d ($[x_3, y_2]$). The SSC may define a common rotation point (142, FIG. 4C) based on the local coordinate system. In order for the SSC to more effectively anticipate the movement of the tracks 110a-c throughout the path, a future path element (look-ahead point) 138 may be defined (e.g., at $[x_1, y_0]$) as a point or vector on the y-axis where y is greater than 0 or less than 0 such that when the tool position 136 corresponds to a current path element of the curved surface (132, FIG. 3), the future path element 138 may be used by the SSC to dynamically determine a curvature of the curved surface 132 at the future path element (and thereby the desired track angles at the future path element) as well as a completion time between exiting the current path element and entering the future path element. Based on these determinations, the SSC may synchronize the rotation of the tracks 110a-c from a current position corresponding to the current path element to a future position corresponding to the future path element 138, relative to the common rotation point, during the completion time. It should be noted that should the tool carrier 100c be reconfigured in operating mode, e.g., should the RF track 110b be repositioned 110d relative to the chassis 102 or other tracks 110a, 110c, the local coordinate system may associate the repositioned track 110d with a new track point 136e, and the SSC may modify its steering and rotational calculations accordingly.

In some embodiments, the future path element 138 and current point or current path element may not be on the y-axis. Such embodiments may be useful for plotting or otherwise incorporating offset paths. For example, a 3D design and 3D system places a curb in a cul-de-sac; then using the edge of the curb, the 3D system offsets outward to place a sidewalk at a constant distance from the curb/road. The 3D system may then modify provided design radius data to reflect the offset. Alternatively, the 3D system may modify provided alignment data associated with the edge of the curb with a modified future path element 138/current path element x-value. The system thereby produces offset shapes without additional CAD/Designing of new machine control files.

Figure 4B:
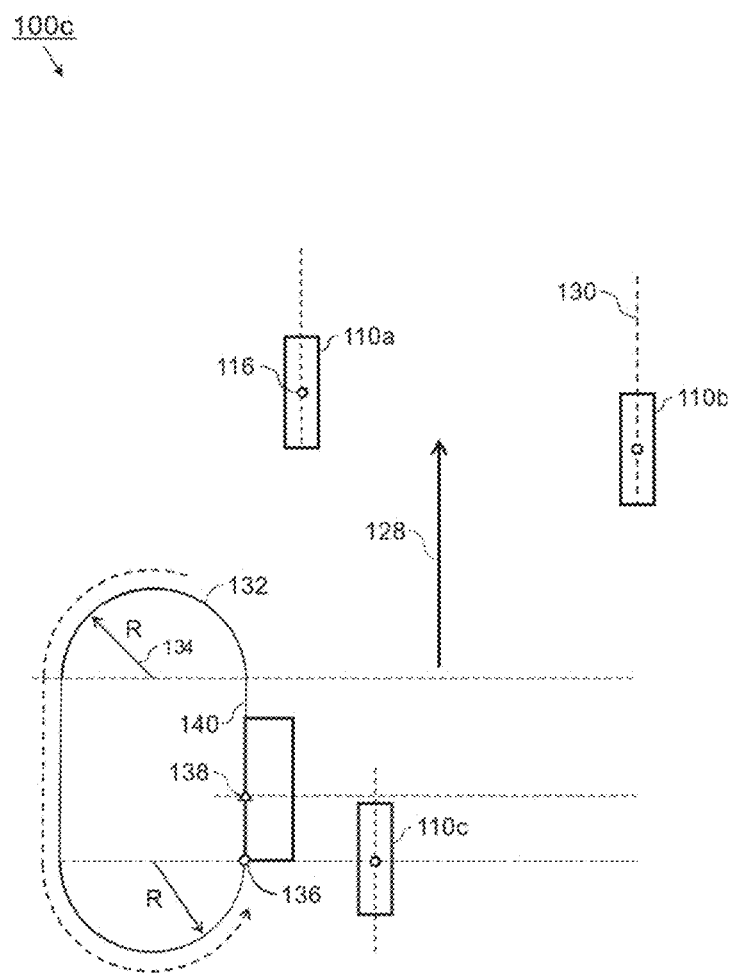
FIG. 4B shows an illustration of short-radius operations of the tool carrier of FIG. 1.

Referring in particular to FIG. 4B, the tool carrier 100c may be configured to pave, according to path elements received from the operator (or externally), a straight-line path (140) before entering the curved surface 132. For example, the tool carrier 100c may commence paving at a point where the tool position 136 aligns with an end of the right-side straight path 140. A future path element 138 may be selected directly ahead of the tool position 136 on the straight path 140. Accordingly, each track 110a-c may remain at the nominal angle 130, aligned with the paving direction 128.

Figure 4C:
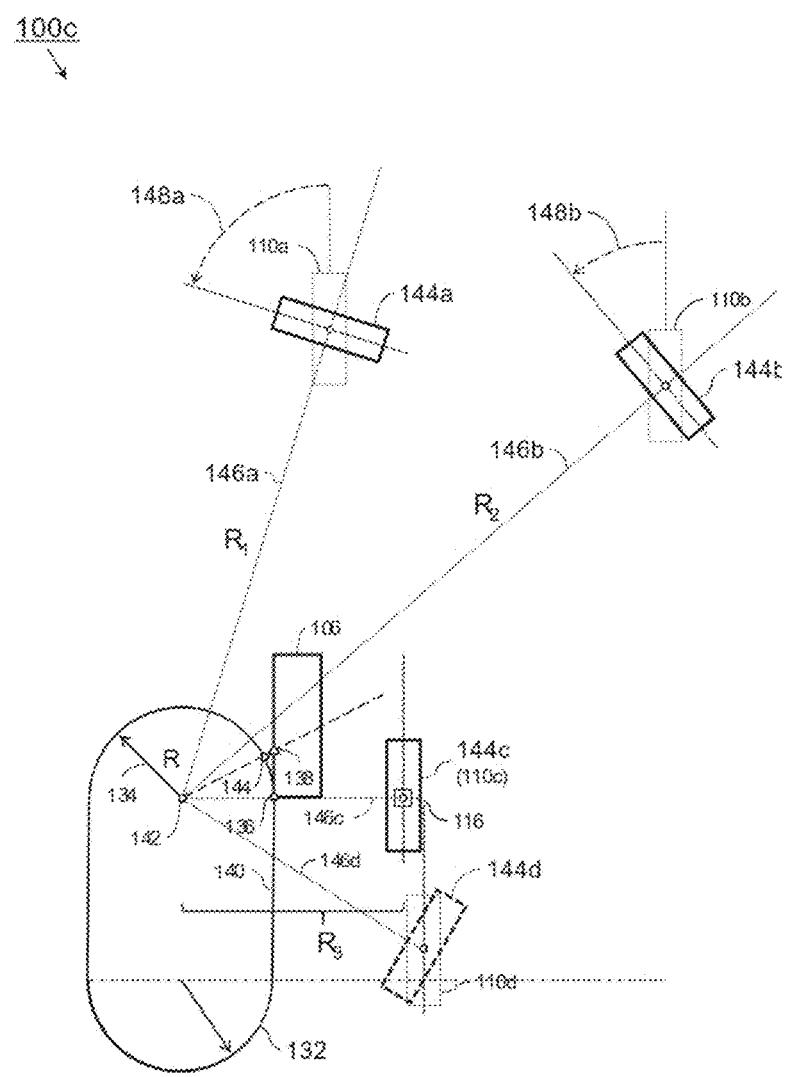
FIG. 4C shows an illustration of short-radius operations of the tool carrier of FIG. 1.

Referring in particular to FIG. 4C, the tool carrier 100c may proceed forward such that the tool position 136 may exit the straight path 140 and enter a short-radius curved path 132 defined by a small radius 134 and target rotation center (common rotation point) 142. The SSC (122, FIG. 2) may monitor the progress of the tool position 136 corresponding to the current path element based on, e.g., input from the position sensors 116. The position of the future path element 138 may indicate that the tool 106 is proceeding into the short-radius curved path 132. As the tool 106 enters the short-radius curved path 132, the future position and orientation 144a-c of each track, shown at a current position/orientation 110a-c, may be determined by a radial vector 146a-c from each track to the common rotation point 142. For example, each future path element corresponding to a future tool position may be associated with a position/orientation 144a-c of each track 110a-c perpendicular to the radial vector 146a-c, including, if the rear track 110d is not aligned with the tool 106, a future position/orientation 144d perpendicular to the radial vector 146d. Similarly, based on the machine speed, which may or may not remain uniform, entry to each future path element 138 along the short-radius curved path 132 may be associated with a completion time relative to the current path element. If, for example, FIG. 4B illustrates a start time to corresponding to the current path element tool position 136 before the tool 106 enters the short-radius curved path 132, then FIG. 4C may illustrate a future path element corresponding to a subsequent time $t_x$ at which the tool position 136 enters the short-radius curved path 132. The rate at which the LF and RF tracks 110a-b are rotated to the desired track angles 148a-b corresponding to their position and orientation 144a-b at the future path element corresponding to subsequent time $t_x$ may then be determined based on, for example, the forward speed of the tool carrier 100c and the determined completion time defined by $t_x$-$t_0$ between the current and future path elements.

Figure 4D:
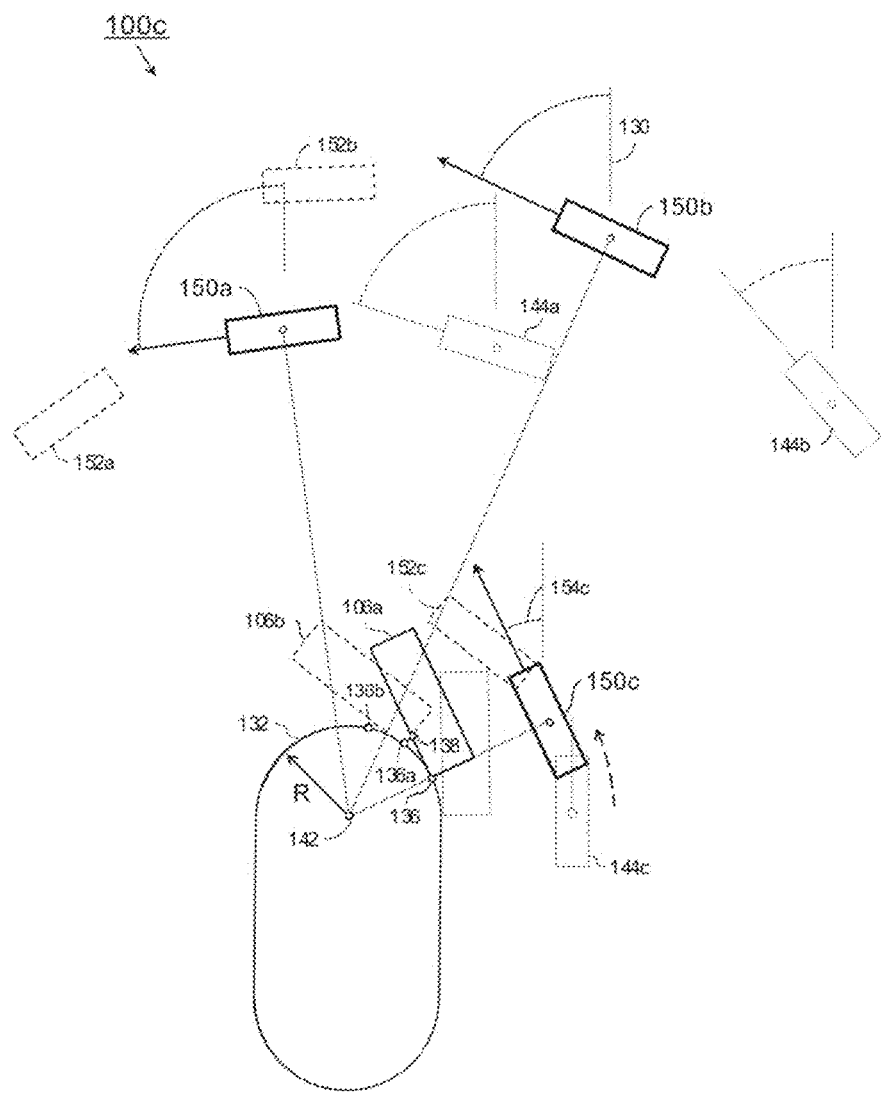
FIG. 4D shows an illustration of short-radius operations of the tool carrier of FIG. 1.

Referring in particular to FIG. 4D, at time $t_x$ the corresponding future path element (138, FIG. 4C) may become the current path element corresponding to the current tool position 136 on the small-radius curved path 132. Similarly, based on the updated positions of the tool 106a and the updated positions/orientations of the tracks 144a-c the SSC may receive subsequent future path elements corresponding to future tool positions 136a-b, each future path element 136a-b corresponding to a position/orientation of the tracks 110a-c at, e.g., future times $t_y$ and $t_z$ (e.g., 150a-c and 152a-c respectively). The SSC may calculate, based on the machine speed and completion times (e.g., $t_y$-$t_x$ and $t_z$-$t_y$) between each future path element as the future path element becomes a current path element and the subsequent future path element, the necessary synchronized rotation for each track to maintain the small-radius curved path 132 as the tracks reach the future path elements at times $t_y$ (positions/orientations 150a-c) and $t_z$ (positions/orientations 152a-c) respectively.

Figure 5:
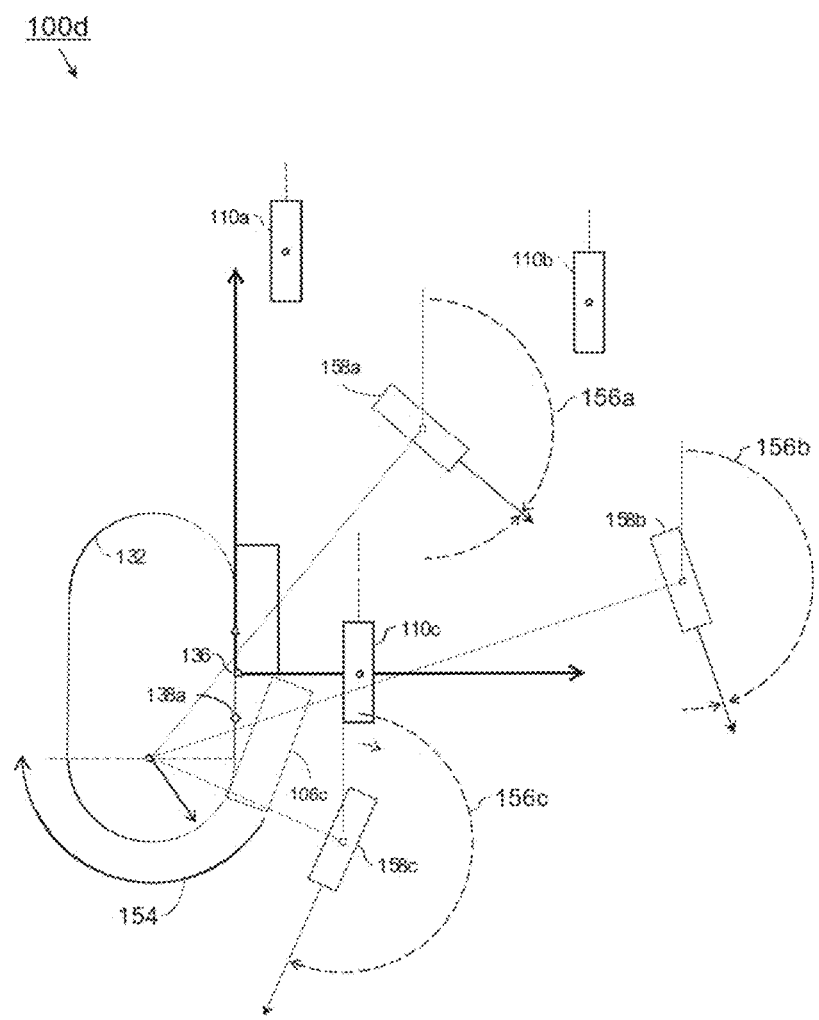
FIG. 5 shows an illustration of reverse operations of the tool carrier of FIG. 1.
Figure 6:
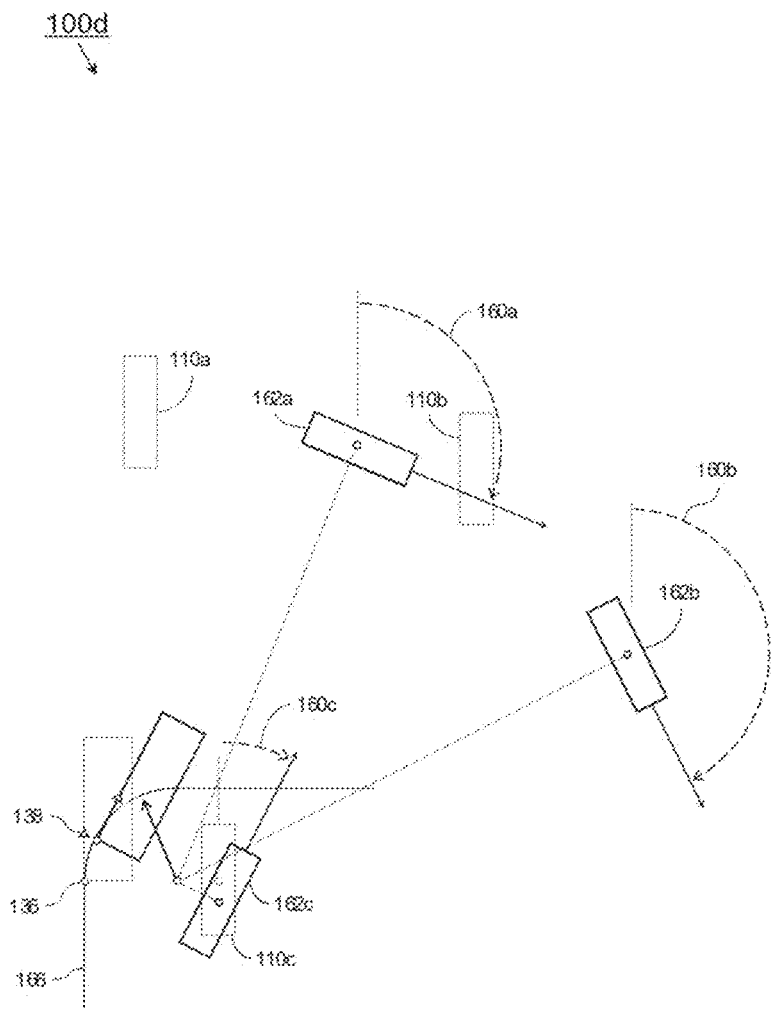
FIG. 6 shows an illustration of clockwise operations of the tool carrier of FIG. 1.
Figure 7:
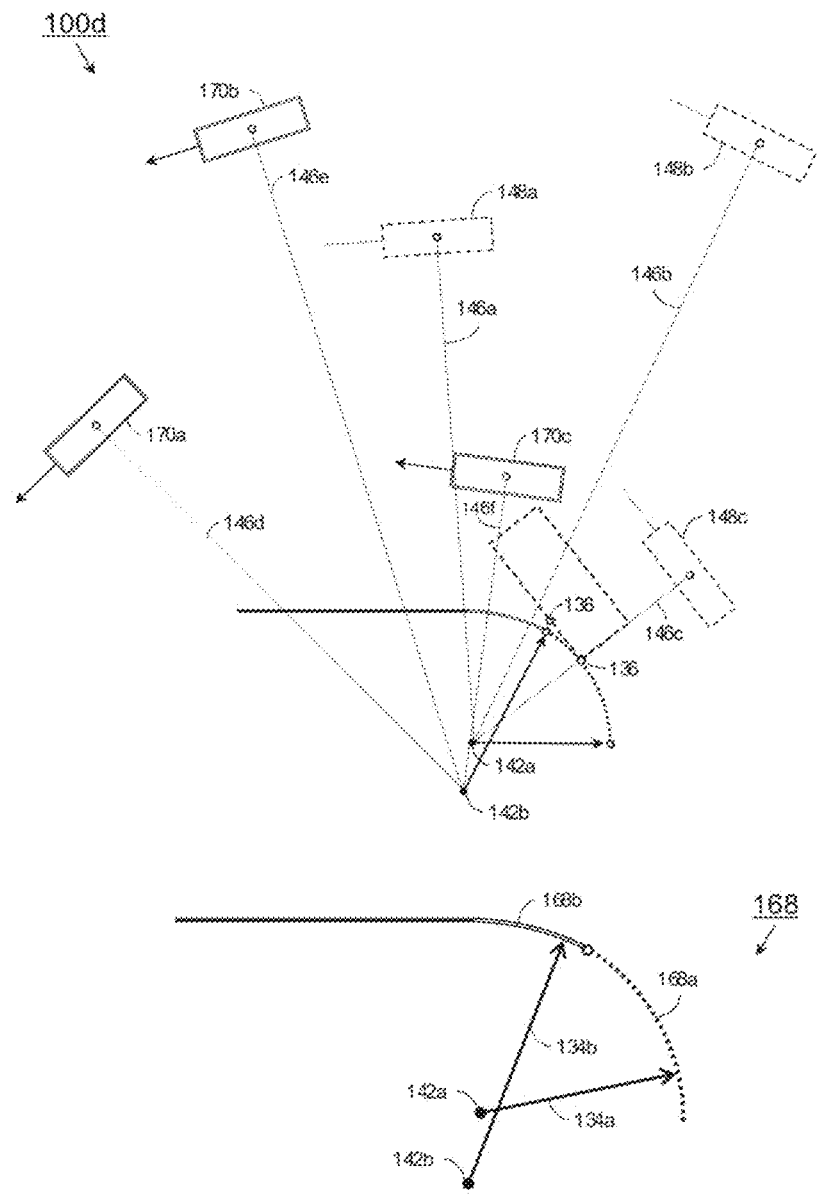
FIG. 7 shows an illustration of combination operations of the tool carrier of FIG. 1.

Referring generally to FIGS. 5-7, the tool carrier 100d may be implemented and may function similarly to the tool carrier 100c of FIGS. 4A-D, except that, referring in particular to FIG. 5, the SCC of the tool carrier 100d may similarly guide the tool carrier through curved path elements while traveling in a clockwise (e.g., "reverse" relative to the orientation of the tool carrier) direction 154, and synchronize the rotation of tracks 110a-c (156a-c) to positions/orientations (158a-c) corresponding to a future path element 138a (tool 106c).

Referring in particular to FIG. 6, the SSC of the tool carrier 100d may synchronize the rotation 160a-c of the tracks 110a-c to positions/orientations 162a-c corresponding to a future path element 138 as the tool carrier 100d proceeds clockwise and forward around a curved path element 166.

Referring in particular to FIG. 7, the tool carrier 100d may proceed around a curved path element 168 defined by multiple radii 134a-b and multiple common rotation points 142a-b. The SSC of the tool carrier may synchronize rotation of the tracks 110a-c between a current path element (positions/orientations 148a-c) and a future path element (positions/orientations 170a-c) based on the first common rotation point 142a (curved path element 168a) or based on the second common rotation point 142b (curved path element 168b) depending on the location of the future path element relative to the curved surface 168.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a tangible memory storing non-transitory processor executable code for configuring the at least one processor to:
    receive a path comprising at least one path element including a radius portion;
    determine a common rotation point associated with the radius portion;
    determine a first angle associated with a first track of a tool carrier, the first angle defined by a distance of the first track from the common rotation point;
    steer the first track to the first angle;
    determine a second angle associated with a second track of a tool carrier, the second angle defined by a distance of the second track from the common rotation point;
    steer the second track to the second angle;
    determine a third angle associated with a third track of a tool carrier, the third angle defined by a distance of the third track from the common rotation point;
    steer the third track to the third angle; and
    calculate a completion time of the at least one path element including the radius portion,
    wherein the at least one path element comprises a portion of a path of a tool.

2. The apparatus of claim 1, wherein:
    the path further comprises at least one path element including a straight portion; and
    the processor executable code further configures the at least one processor to:
    determine a fourth angle associated with the first track defined by the straight portion;
    determine a fifth angle associated with the second track defined by the straight portion; and
    determine a sixth angle associated with the third track defined by the straight portion.

3. The apparatus of claim 2, wherein the processor executable code further configures the at least one processor to:
    transition the first track from the first angle to the fourth angle after the completion time has elapsed;
    transition the second track from the second angle to the fifth angle after the completion time has elapsed; and transition the third track from the third angle to the sixth angle after the completion time has elapsed.

4. The apparatus of claim 1, wherein:
the at least one path element comprises a first path element including a first radius portion;
the path further comprises a second path element including a second radius portion distinct from the first radius portion; and
the processor executable code further configures the at least one processor to:
   determine a second common rotation point associated with the second radius portion;
   determine a fourth angle associated with the first track defined by a distance of the first track from the second common rotation point;
   determine a fifth angle associated with the second track defined by a distance of the second track from the second common rotation point; and
   determine a sixth angle associated with the third track defined by a distance of the third track from the second common rotation point.

5. The apparatus of claim 4, wherein the processor executable code further configures the at least one processor to:
transition the first track from the first angle to the fourth angle after the completion time has elapsed;
transition the second track from the second angle to the fifth angle after the completion time has elapsed; and
transition the third track from the third angle to the sixth angle after the completion time has elapsed.

6. The apparatus of claim 1, wherein:
the at least one path element comprises a variable radius curve; and
the processor executable code further configures the at least one processor to:
   determine a first track function for smoothly altering the angle of the first track from the first angle to carry a tool through the at least one path element during the completion time;
   determine a second track function for smoothly altering the angle of the second track from the first angle to carry a tool through the at least one path element during the completion time; and
   determine a third track function for smoothly altering the angle of the third track from the first angle to carry a tool through the at least one path element during the completion time.

7. A method for paving comprising:
receiving a paving tool path comprising at least one path element including a radius portion;
determining a common rotation point associated with the radius portion;
determining a first angle associated with a first track of a tool carrier, the first angle defined by a distance of the first track from the common rotation point;
determining a second angle associated with a second track of the tool carrier, the second angle defined by a distance of the second track from the common rotation point;
determining a third angle associated with a third track of the tool carrier, the third angle defined by a distance of the third track from the common rotation point;
calculating a completion time of the at least one path element, wherein the at least one path element comprises a variable radius curve;
determining a first track function for smoothly altering the angle of the first track from the first angle to carry a tool through the at least one path element during the completion time;
steer the first track according to the first track function;
determining a second track function for smoothly altering the angle of the second track from the first angle to carry a tool through the at least one path element during the completion time; and
steer the second track according to the second track function;
determining a third track function for smoothly altering the angle of the third track from the first angle to carry a tool through the at least one path element during the completion time; and
steer the third track according to the third track function.

8. The method of claim 7, further comprising:
determining a fourth angle associated with the first track defined by at least one path element in the paving tool path, the at least one path element including a straight portion;
determining a fifth angle associated with the second track defined by the straight portion; and
determining a sixth angle associated with the third track defined by the straight portion.

9. The method of claim 8, further comprising:
transitioning the first track from the first angle to the fourth angle after the completion time has elapsed;
transitioning the second track from the second angle to the fifth angle after the completion time has elapsed; and
transitioning the third track from the third angle to the sixth angle after the completion time has elapsed.

10. The method of claim 9, further comprising:
determining a second common rotation point associated with a second radius portion, wherein the at least one path element comprises a first path element including a first radius portion and the path further comprises a second path element including the second radius portion distinct from the first radius portion;
determining a fourth angle associated with the first track defined by a distance of the first track from the second common rotation point;
determining a fifth angle associated with the second track defined by a distance of the second track from the second common rotation point; and
determining a sixth angle associated with the third track defined by a distance of the third track from the second common rotation point.

11. The method of claim 10, further comprising:
transitioning the first track from the first angle to the fourth angle after the completion time has elapsed;
transitioning the second track from the second angle to the fifth angle after the completion time has elapsed; and
transitioning the third track from the third angle to the sixth angle after the completion time has elapsed.

12. A tool carrier comprising:
a chassis;
at least three steerable tracks connected to the chassis; and
at least one processor in data communication with a memory storing processor executable code for configuring the at least one processor to:
   receive a path comprising at least one path element including a radius portion;
   determine a common rotation point associated with the radius portion;

determine a first angle associated with a first track in the at least three steerable tracks, the first angle defined by a distance of the first track from the common rotation point;

steer the first track to the first angle;

determine a second angle associated with a second track in the at least three steerable tracks, the second angle defined by a distance of the second track from the common rotation point;

steer the second track to the second angle;

determine a third angle associated with a third track in the at least three steerable tracks, the third angle defined by a distance of the third track from the common rotation point;

steer the third track to the third angle; and calculate a completion time of the at least one path element including the radius portion, wherein the at least one path element comprises a portion of a path of a tool.

13. The tool carrier of claim 12, wherein:

the path further comprises at least one path element including a straight portion; and the processor executable code further configures the at least one processor to:

determine a fourth angle associated with the first track defined by the straight portion;

determine a fifth angle associated with the second track defined by the straight portion; and determine a sixth angle associated with the third track defined by the straight portion.

14. The tool carrier of claim 13, wherein the processor executable code further configures the at least one processor to:

transition the first track from the first angle to the fourth angle after the completion time has elapsed;

transition the second track from the second angle to the fifth angle after the completion time has elapsed; and transition the third track from the third angle to the sixth angle after the completion time has elapsed.

15. The tool carrier of claim 12, wherein:

the at least one path element comprises a first path element including a first radius portion;

the path further comprises a second path element including a second radius portion distinct from the first radius portion; and the processor executable code further configures the at least one processor to:

determine a second common rotation point associated with the second radius portion;

determine a fourth angle associated with the first track defined by a distance of the first track from the second common rotation point;

determine a fifth angle associated with the second track defined by a distance of the second track from the second common rotation point; and determine a sixth angle associated with the third track defined by a distance of the third track from the second common rotation point.

16. The tool carrier of claim 15, wherein the processor executable code further configures the at least one processor to:

transition the first track from the first angle to the fourth angle after the completion time has elapsed;

transition the second track from the second angle to the fifth angle after the completion time has elapsed; and transition the third track from the third angle to the sixth angle after the completion time has elapsed.

17. The tool carrier of claim 12, wherein the processor executable code further configures the at least one processor to:

determine a front error associated with a front point of the tool carrier;

determine a rear error associated with a rear point of the tool carrier;

multiply the front error and rear error by a steering authority to produce a virtual correction;

add the virtual correction to each of an instantaneous front angle and rear angle;

calculate a synchronization point based of a line-line intersection of the front point and rear point and the corrected instantaneous front angle and rear angle; and update an angle and propulsion speed associated with each of the at least three steerable tracks based on the synchronization point.

* * * * *